US010047637B2

(12) United States Patent
Mierisch et al.

(10) Patent No.: US 10,047,637 B2
(45) Date of Patent: Aug. 14, 2018

(54) INTERMEDIATE PRESSURE STORAGE SYSTEM FOR THERMAL STORAGE

(75) Inventors: Robert Charles Mierisch, Redwood City, CA (US); Stephen James Bisset, Palo Alto, CA (US)

(73) Assignee: TERRAJOULE CORPORATION, Redwood City, CA (US)

( * ) Notice: Subject to any disclaimer, the term of this patent is extended or adjusted under 35 U.S.C. 154(b) by 1736 days.

(21) Appl. No.: 12/748,353

(22) Filed: Mar. 26, 2010

(65) Prior Publication Data
US 2010/0252028 A1     Oct. 7, 2010

Related U.S. Application Data

(60) Provisional application No. 61/163,459, filed on Mar. 26, 2009.

(51) Int. Cl.
*F01K 13/02* (2006.01)
*F01K 3/00* (2006.01)
(Continued)

(52) U.S. Cl.
CPC ............ *F01K 3/008* (2013.01); *F01K 13/02* (2013.01); *F22B 1/006* (2013.01); *F28D 20/00* (2013.01); *Y02E 10/46* (2013.01)

(58) Field of Classification Search
CPC ........... F01K 23/08; F01K 23/04; F01K 15/00
(Continued)

(56) References Cited

U.S. PATENT DOCUMENTS 3,129,564 A     4/1964 Brunner
3,218,802 A  * 11/1965 Sawle .................... F01K 23/02
                                                    376/380

(Continued)

FOREIGN PATENT DOCUMENTS

DE          377820       6/1923
EP        0 976 914      2/2000
(Continued)

OTHER PUBLICATIONS

STIC—Translations, Translation of DE377820, Apr. 25, 2018.*
(Continued)

*Primary Examiner* — Avinash Savani
*Assistant Examiner* — Deepak Deean
(74) *Attorney, Agent, or Firm* — Beyer Law Group LLP

(57) ABSTRACT

In some implementations, there is provided an apparatus. The apparatus may include a first steam engine, an intermediate storage, and a second steam engine. The first steam engine may include a first inlet and a first exhaust, wherein the first inlet receives steam from a source of thermal energy. The intermediate storage may be coupled to the first exhaust, wherein the intermediate storage stores thermal energy provided by steam from the first exhaust. The second steam engine may include a second inlet coupled to the intermediate storage. Moreover, at least one of the first steam engine and the second steam engine may produce work. Furthermore, the first steam engine may be driven by the steam received from the source of thermal energy, and the second steam engine may be driven by steam from at least one of the intermediate storage and the first exhaust. Related apparatus and methods are also described.

16 Claims, 11 Drawing Sheets

(51) Int. Cl.
*F22B 1/00* (2006.01)
*F28D 20/00* (2006.01)

(58) Field of Classification Search
USPC .............................. 126/640, 645; 60/641.15
See application file for complete search history.

(56) References Cited

U.S. PATENT DOCUMENTS

| | | | | |
|---|---|---|---|---|
| 3,365,888 | A * | 1/1968 | Andersen | F01K 7/44 376/317 |
| 3,397,619 | A * | 8/1968 | Sturtevant | F01B 3/0008 91/182 |
| 3,568,444 | A * | 3/1971 | Harris | F01K 7/02 60/653 |
| 3,668,974 | A * | 6/1972 | Hagdorn | F01B 17/04 91/242 |
| 3,756,022 | A * | 9/1973 | Pronovost | F01K 7/34 123/1 R |
| 4,045,978 | A * | 9/1977 | Abrahams | F02G 1/044 60/521 |
| 4,079,591 | A * | 3/1978 | Derby et al. | 60/641.8 |
| 4,094,148 | A | 6/1978 | Nelson | |
| 4,099,381 | A * | 7/1978 | Rappoport | F03G 6/067 126/616 |
| 4,106,294 | A * | 8/1978 | Czaja | F01K 21/04 60/649 |
| 4,122,680 | A * | 10/1978 | Isshiki | F01K 5/00 60/649 |
| 4,164,848 | A | 8/1979 | Gilli et al. | |
| 4,204,258 | A * | 5/1980 | Zitelli | F01D 17/24 290/40 A |
| 4,309,877 | A * | 1/1982 | Tawse | F02G 5/00 62/238.1 |
| 4,455,835 | A * | 6/1984 | Durrant | 60/659 |
| 5,531,073 | A | 7/1996 | Bronicki et al. | |
| 5,660,165 | A * | 8/1997 | Lannes | 126/641 |
| 5,970,714 | A * | 10/1999 | Bronicki | F01K 23/04 60/641.3 |
| 6,951,107 | B1 * | 10/2005 | Bishop | F01K 7/12 60/670 |
| 7,637,457 | B2 * | 12/2009 | Bennett | B64C 39/024 244/59 |
| 7,770,376 | B1 * | 8/2010 | Brostmeyer | 60/39.182 |
| 7,821,151 | B2 * | 10/2010 | Le et al. | 290/55 |
| 1,033,280 | A1 | 7/2012 | Skinner et al. | |
| 8,752,381 | B2 * | 6/2014 | Bronicki | F22B 3/04 60/651 |
| 1,159,112 | A1 | 11/2015 | Skinner | |
| 2005/0198959 | A1 * | 9/2005 | Schubert | F03G 6/00 60/641.8 |
| 2006/0108988 | A1 * | 5/2006 | McKelvey et al. | 323/205 |
| 2007/0220889 | A1 * | 9/2007 | Nayef | F01K 3/08 60/652 |
| 2009/0019853 | A1 * | 1/2009 | Nilsson | F01K 21/047 60/715 |
| 2009/0090109 | A1 * | 4/2009 | Mills et al. | 60/659 |
| 2009/0121495 | A1 * | 5/2009 | Mills | F01K 3/00 290/4 D |
| 2009/0294096 | A1 * | 12/2009 | Mills | F28D 20/0043 165/45 |
| 2010/0242495 | A1 * | 9/2010 | DeMoss et al. | 60/801 |
| 2010/0269817 | A1 * | 10/2010 | Kelly | 126/698 |
| 2010/0307153 | A1 * | 12/2010 | Hinderling | 60/641.8 |
| 2011/0162362 | A1 | 7/2011 | Steiner | |
| 2011/0192164 | A1 * | 8/2011 | Farkaly | F01K 3/00 60/670 |
| 2012/0319410 | A1 * | 12/2012 | Ambrosek et al. | 290/1 R |
| 2013/0147197 | A1 * | 6/2013 | Goebel et al. | 290/52 |
| 2013/0312413 | A1 * | 11/2013 | Herzog | F03G 6/065 60/641.15 |

FOREIGN PATENT DOCUMENTS

| | | | | |
|---|---|---|---|---|
| EP | 1927749 A2 | 6/2008 | | |
| FR | 506360 | 8/1920 | | |
| FR | 567604 | 3/1924 | | |
| JP | 09-137704 A | 5/1997 | | |
| JP | 11-117713 A | 4/1999 | | |
| WO | WO 2008/006174 | 1/2008 | | |
| WO | WO 2008006174 A1 * | 1/2008 | | F28D 20/0043 |
| WO | WO 2008153946 A2 * | 12/2008 | | F01K 23/10 |
| WO | WO-2009-034577 A2 | 3/2009 | | |
| WO | WO 2010/027360 | 3/2010 | | |
| WO | WO 2010027360 A2 * | 3/2010 | | F03G 6/00 |

OTHER PUBLICATIONS

Chinese Office Action dated Sep. 4, 2013 from Chinese Patent Application No. 201080023040.8.
Australian Office Action dated Nov. 22, 2013 from Australian Application No. 2010229676.
Image of a Fireless Steam Locomotive.
W.B. Hall, "Cylinder Condensation in Unsuperheated Steam Engines", 1983.
Skinner Engine Company, "How to Operate and Maintain Skinner Universal Unaflow Steam Engines", National Engineer, Oct.-Nov. 1960.
Skinner Engine Company, "Skinner Marine Unaflow Steam Engines", 1952.
Skinner Engine Company, "Skinner Universal Unaflow Steam Engines, Vertical Type", 1950.
Indian Office Action dated Apr. 27, 2018 from Indian Application No. 4107/KOLNP/2011.
Extended European Search Report dated Jul. 6, 2017 from European Application No. 10756978.2.

* cited by examiner

INTERMEDIATE PRESSURE STORAGE SYSTEM FOR THERMAL STORAGE

CROSS REFERENCE TO RELATED APPLICATION

This application claims the benefit under 35 U.S.C. § 119(e) of the following provisional application, which is incorporated herein by reference in its entirety: U.S. Ser. No. 61/163,459, entitled "SLIDING INTERMEDIATE PRESSURE SYSTEM FOR THERMAL STORAGE WITH STEAM ENGINES OR TURBINES," filed Mar. 26, 2009.

FIELD

The present disclosure generally relates to solar collection.

BACKGROUND

Solar energy offers the promise of a clean source of energy. To tap that source of energy, an approach, here called solar thermal, uses the sun's energy to heat a substance, typically a fluid, and then mechanically converts that heat into power. However, it is often desirable to be able to capture the sun's energy while the sun is available, store some of the captured energy, and then perform the conversion into power at a later time. To that end, some systems contemplate the use of cumbersome and costly storage mechanisms such as molten salt. The molten salt retains the thermal energy produced when sunlight is available, making the stored thermal energy available for conversion to work when there is insufficient sunlight to generate electricity (e.g., on a cloudy day or at night).

SUMMARY

In some aspects, there is provided an apparatus. The apparatus may include a first steam engine, an intermediate storage, and a second steam engine. The first steam engine may include a first inlet and a first exhaust, wherein the first inlet receives steam generated by a source of thermal energy. The intermediate storage may be coupled to the first exhaust, wherein the intermediate storage stores thermal energy provided by steam from the first exhaust. The second steam engine may include a second inlet coupled to the intermediate storage. Moreover, at least one of the first steam engine and the second steam engine may produce work. Furthermore, the first steam engine may be driven by the steam generated by the source of thermal energy, and the second steam engine may be driven by steam from at least one of the intermediate storage and the first exhaust.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
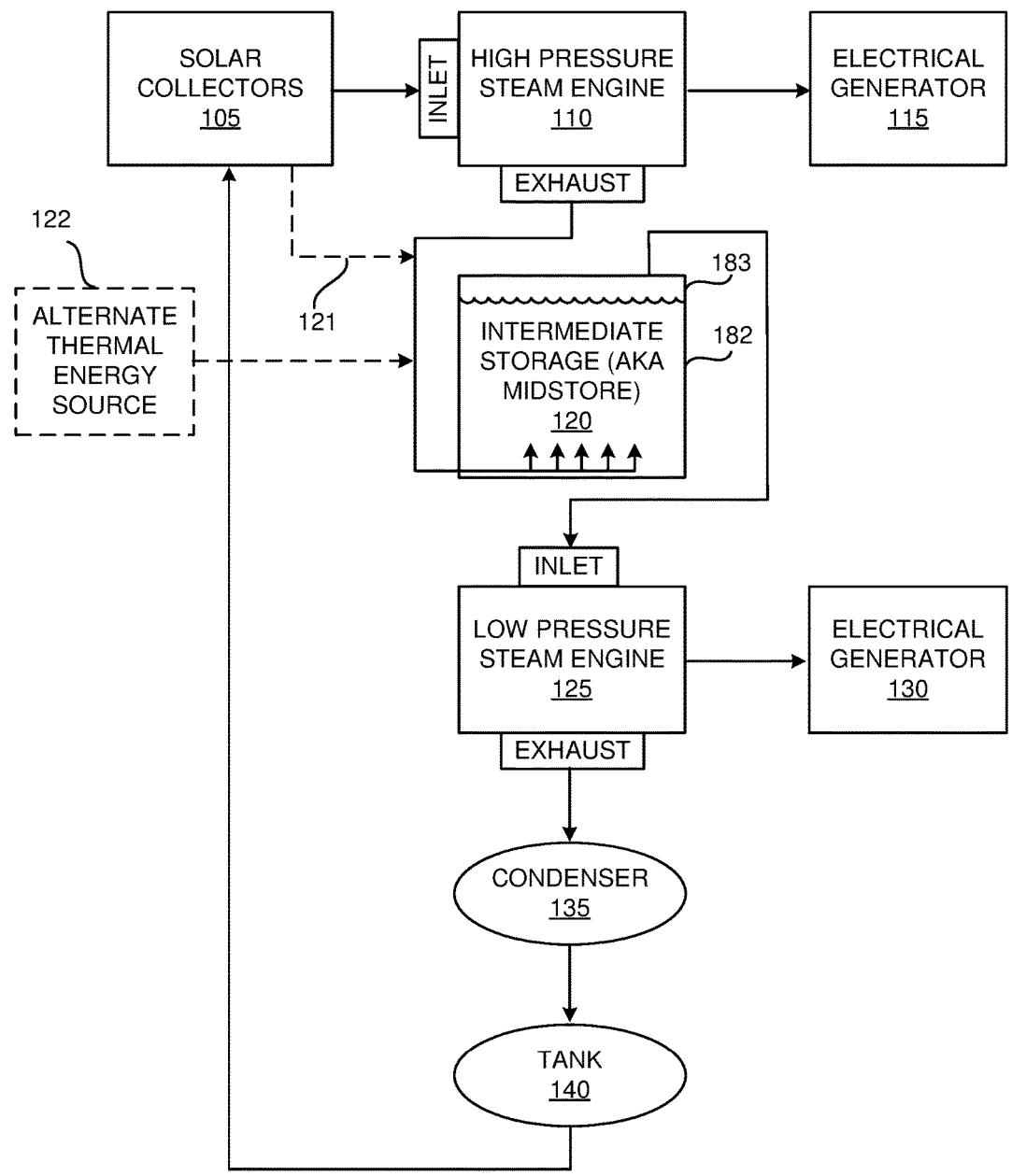
FIG. 1 depicts a block diagram of a system 100 for producing power using a combination of low and high pressure engines and an intermediate storage.

Like labels are used to refer to same or similar items in the drawings.

DETAILED DESCRIPTION

The subject matter described herein provides a high pressure steam engine, a low pressure steam engine, and an intermediate storage device situated between the high and low pressure steam engines to absorb and return energy. Moreover, the high pressure and low pressure steam engines and the intermediate storage together provide power that is responsive to changes in demand while continuing to efficiently collect energy from incident sunlight. Although some of the examples described herein refer to a separate low pressure steam engine and high pressure steam engine, a steam engine including both high and low pressure stages may be used as well, with an intermediate storage device located between the high pressure stage and the low pressure stage.

FIG. 1 depicts a block diagram of a system 100 for generating power, such as electricity, using a combination of low and high pressure engines and an intermediate storage. The system 100 may include solar collectors 105, a high pressure steam engine 110, an electrical generator 115, an intermediate storage 120 for storing the energy of system 100, a low pressure steam engine 125, an electrical generator 130, a condenser 135, and a storage tank 140. The components of system 100 are coupled as depicted in FIG. 1 via a fluid transfer mechanism, such as pipes, tubing, a pump, and the like, and the steam engine may be connected to the respective electrical generators via a mechanical transfer mechanism, such as a shaft.

The solar collectors 105 may be implemented as any device capable of heating a gas, a solid, and/or a liquid. For example, the solar collectors 105 may include tubes containing a fluid, such as water, oil, etc. The fluid may be heated by sunlight reflected by mirrors or concentrated by lenses. In some cases, the heated fluid travels to a heat exchanger that heats water, generating high pressure steam. The high pressure steam is then provided to an inlet of the high pressure steam engine 110. In implementations having water as the fluid being heated directly by the solar collectors, the heat imparted by the sunlight converts the water to high pressure steam, which is provided directly to an inlet of the high pressure steam engine 110.

Although FIG. 1 depicts solar collectors 105, other non-solar sources of heat may be used as well. The non-solar sources may be used as alternates to, as complements to, or in combination with, a solar source.

The high pressure steam engine 110 may be implemented as any type of steam engine including reciprocating steam engines, such as a simple steam engine, a compound steam engine, a unaflow steam engine, a universal unaflow steam engine, and the like. The high pressure steam engine 110 extracts a portion of the thermal energy from the high pressure steam provided by the solar collectors 105. For example, during the admission phase of the high pressure steam engine 110, high pressure steam is admitted into one or more cylinders, such that during the expansion phase the steam expands and drives the piston(s). Thus, energy is extracted from the steam. This expansion phase may drive the piston(s) and a coupled shaft to drive the electrical generator 115. The expansion phase may also drive other loads, such as a pump or other mechanism.

The valve timing of the high pressure steam engine may be varied to maintain, at the inlet, a high pressure and a high temperature of the high pressure steam (e.g., a level of temperature and pressure at which the solar collectors 105 and high pressure engine 110 are designed to operate efficiently). Maintaining the steam at a high pressure and a high temperature at, for example, the inlet to the high pressure steam engine 110 typically results in the greatest Rankine efficiency, producing thus the greatest average amount of power at system 100.

Given that the mass flow rate of steam at the inlet to the high pressure steam engine 110 varies during the day (for example as the amount of generated thermal heat varies), the high pressure steam engine 110 adjusts the valve timing to admit a given amount of steam into the cylinder of the high pressure steam engine 110, thus maintaining at the inlet a target range of high pressure and high temperature. For example, the valve timing controls the mass flow rate at the inlet of the high pressure steam engine. By varying the mass flow rate of steam at the inlet of the high pressure steam engine (e.g., by varying the amount of steam admitted into the cylinders(s) of the high pressure steam engine), the temperature and the pressure at the inlet may be controlled to a target pressure and/or a target temperature. For example, the temperature at the inlet of the high pressure steam engine 110 may be controlled to maintain a target temperature between about 288 degrees Celsius and 316 degrees Celsius and a target pressure of between about 38.3 bar absolute and 42.4 bar absolute.

Although some of the examples described herein vary the timing (e.g., cutoff) of the valves to vary the mass flow rate, the mass flow rate may be varied in other ways as well. For example, the high pressure steam engine 110 may vary the rotations per minute to vary the average amount of steam admitted into the cylinder(s) in a given interval of time, controlling thus the mass flow rate at the inlet of the high pressure steam engine. In addition, the high pressure steam engine 110 may vary the available volume of the cylinders to vary the amount of steam admitted into the cylinder(s), controlling thus the mass flow rate at the inlet of the high pressure steam engine. The volume of the cylinders may be varied by, for example, varying the number of cylinders to which steam is admitted. For example, increasing the number of cylinders to which steam is admitted from 1 cylinder to 4 cylinders would increase the mass flow rate.

The exhaust of the high pressure steam engine 110 has a pressure and a temperature that is typically lower than the inlet. For example, the exhaust of the high pressure steam engine 110 may have a pressure of between about 2.5 and 7.8 bar absolute and a temperature of between about 127 degrees Celsius and 199 degrees Celsius.

The electrical generators 115 and 130 may be implemented as any device capable of generating electricity from mechanical power. Moreover, the electrical generators 115 and 130 may include a mechanism, such as a drive shaft for applying mechanical power. For example, the electrical generator 115 may be coupled to a shaft that is further coupled to the high pressure steam engine 110. The shaft is driven by the piston(s) of the high pressure steam engine 110. Thus, as high pressure steam cycles through the high pressure steam engine 110, the shaft is driven by the piston(s) of the high pressure steam engine to produce electricity at the electrical generator 115. The electrical generator 130 is similarly coupled to the low pressure steam engine 125 to produce electricity.

Although FIG. 1 depicts separate electrical generators 115 and 130, a single electrical generator may be coupled to the steam engines 110 and 125 as well. When this is the case, the low and high pressure steam engines 110 and 125 may, singly or in combination, apply power to a single electrical generator. Moreover, the connection between the electrical generator(s) and one or more of the high pressure engine and the low pressure engine may include a clutch or other mechanism to disconnect an engine from the generator when that engine is not being used. In another configuration, one or more pistons of an engine may be connected directly to a linear electrical generator so that power may be transmitted from a piston to a generator without the use of a crankshaft.

The intermediate storage 120 stores the heat energy from steam exhaust provided by the high pressure steam engine. The intermediate storage 120 may also optionally store energy from steam piped directly from the thermal energy source without passing through the high pressure engine (as illustrated by dashed line 121). The intermediate storage 120 may also optionally store energy from energy sources (122) other than the energy source used to generate steam for the high pressure engine, such as electrical energy that is converted to thermal energy and used to provide heat to the intermediate storage 120. Such energy may also include waste or surplus energy, electrical, heat, or chemical, from power plants or other external processes. The intermediate storage 120 may provide a source of steam to drive the low pressure steam engine 125, when there is insufficient sunlight and/or when the high pressure steam engine alone cannot meet the demand for power.

The intermediate storage 120 may be implemented as a vessel containing a thermal storage medium, such as a fluid (e.g., water, oil, etc.), a solid, or other materials including phase change materials.

In some implementations, the intermediate storage 120 may use water as a thermal storage medium, in which case the intermediate storage 120 may not be completely filled with water 182 to allow some space 183 for saturated steam above the water 182 level. The pressurized intermediate storage 120 may enable the water 182 to be heated to temperatures well above 100 Celsius, increasing thus the quantity of energy that can be stored in a given mass of water. For example, the heat energy provided from the exhaust of the high pressure steam engine 110 may be imparted by introducing the exhaust steam into the intermediate storage 120 above the level of the water 182, such that some of the steam condenses on the water 182. Moreover, the heat energy provided from the exhaust of the high pressure steam engine 110 may be imparted by introducing exhaust steam into the intermediate storage 120 below the level of the water 182, such that some of the steam condenses in the water 182.

The heat energy provided from the exhaust of the high pressure steam engine 110 may be imparted to the thermal storage medium (e.g., water, oil, molten salt, sand, etc.) in the intermediate storage 120 by means of a heat exchanger. For example, the steam from the exhaust of the high pressure steam engine 110 may flow to the heat exchanger (which is described below with respect to FIG. 5B). As the heat exchanger is heated by the exhaust, the heat exchanger heats the thermal storage medium contained in the intermediate storage 120.

The intermediate storage 120 may be rated for the maximum saturation temperature and pressure of the steam exhaust from high pressure steam engine 110. For example, the intermediate storage 120 may be able to contain water and steam at temperatures between about 127 and 169 degrees Celsius and a pressure up to about 7.8 bar absolute, although the intermediate storage 120 may support other temperatures and pressures as well. If the intermediate storage 120 were directly coupled to the inlet of the high pressure steam engine, the intermediate storage 120 would need to be rated for much higher temperatures and higher pressures. In some implementations, the lower temperature and lower pressure of the exhaust of the high pressure steam engine 110 enables lower weight and lower cost vessels to be used as the intermediate storage 120.

When steam flows from the exhaust of the high pressure steam engine 110 into the intermediate storage 120, the temperature within the intermediate storage 120 increases. On the other hand, when energy is being withdrawn from the intermediate storage 120 device by the low pressure steam engine 125, the temperature within the intermediate storage 120 decreases.

The low pressure steam engine 125 may be implemented as any type of steam engine including reciprocating steam engines, such as a simple steam engine, a compound steam engine, a uniflow steam engine, a universal uniflow steam engine, and the like. In some implementations, the low pressure steam engine 125 does not obtain steam directly from the solar collectors 105 but rather from the intermediate storage 120, which is at a lower pressure and a lower temperature than the steam provided by the solar collectors 105. The low pressure steam engine 125 is typically operative when the high pressure steam engine alone cannot meet the demand for power. For example, at night steam from the solar collectors 105 would clearly not be available. When this is the case, the low pressure steam engine 125 may operate using steam from the intermediate storage 120 to drive electrical generator 130. During the day, the high pressure steam engine 110 may not be able to meet the demand for power. This shortfall in demand may be met by the low pressure steam engine 125, which obtains steam from the intermediate storage 120 and/or the exhaust of the high pressure engine 110. The low pressure steam engine 125 and adds its power output to the power output of the high pressure engine so that in combination the engines enable the system 100 to meet the demand for power.

The condenser 135 of FIG. 1 may be used to condense the steam exhaust from the low pressure steam engine 125. The condensed water may be kept in the storage tank 140 until a pump recirculates the water back to the solar collectors 105. The solar collectors 105 may heat the recirculated water directly to generate steam, or may heat a fluid that provides heat to a heat exchanger where the recirculated water is converted to steam.

Figure 2A:
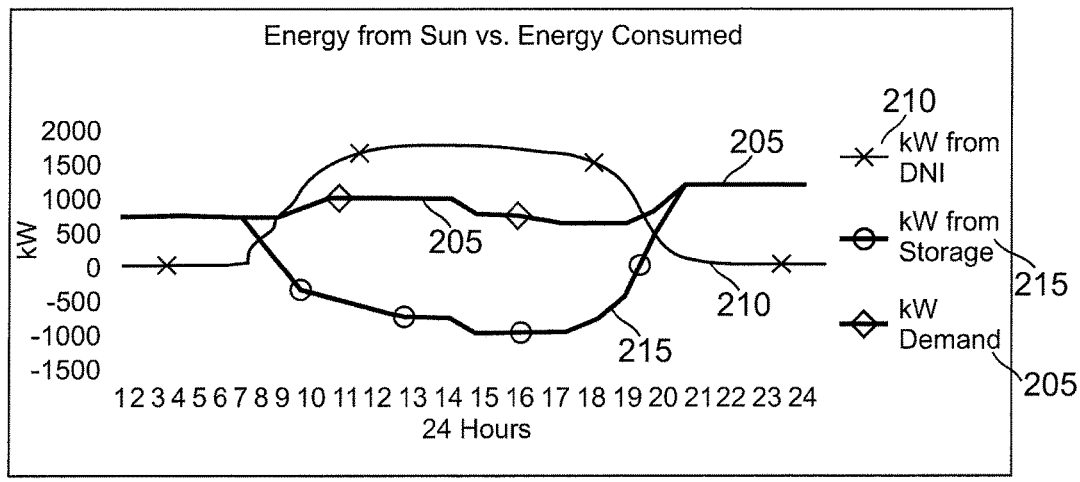
FIGS. 2A-C depict various energy plots over a 24-hour period.
Figure 2B:
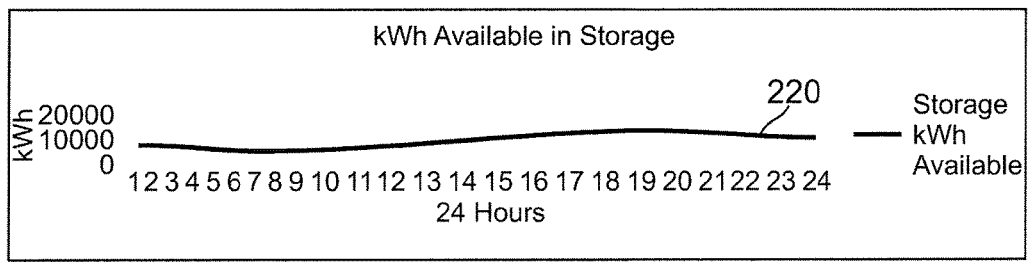
Figure 2C:
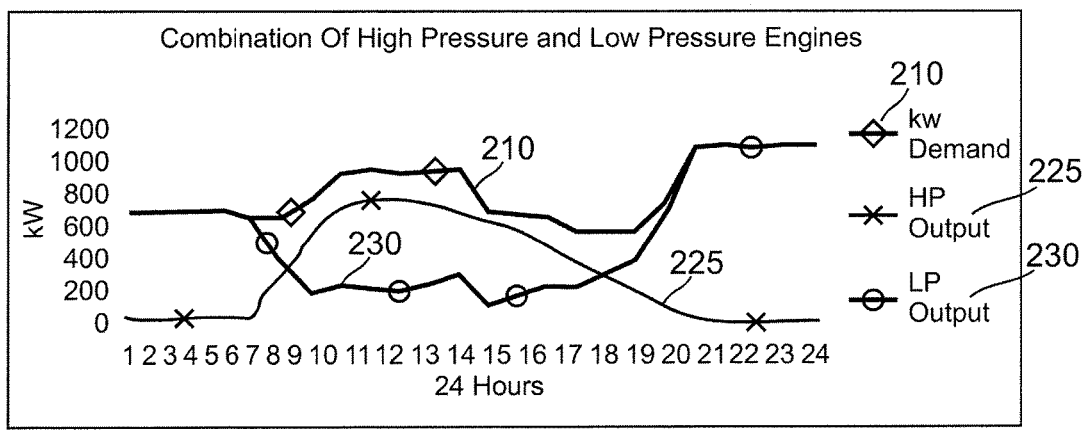

To illustrate operation of system 100, FIGS. 2A-2C depict energy curves over a 24-hour period. Referring to FIGS. 1 and 2A-2C, the kilowatt demand line 205 depicts an example of energy use by an entity over a given 24-hour period. The kilowatt demand 205 varies throughout the 24-hour period as the rate of energy demand varies through- out the day. The energy collected by the solar collectors via direct normal irradiance (DNI) is plotted at 210. The DNI 210 depicts the energy derived from sunlight (e.g., thermal energy generated by solar collectors 105 as a direct result of the sun rather than intermediate storage 120).

Although FIGS. 2A-2C relate to DNI, other solar collection mechanisms may be used as well. Moreover, FIGS. 2A-2C merely depict an example as other energy budgets/values may be used as well. In addition, FIGS. 2A and 2C depict an example sized so that the total energy derived from sunlight (net of losses and inefficiencies) is, when averaged over a 24-hour period, about equal to the demand averaged over a 24-hour period. In other cases, the system may be sized to exceed the demand over a typical 24-hour period in order to meet a larger demand if required. A system may also be sized to provide less than the demand over a typical 24-hour period, and thus be designed to operate in combination with another source of electrical power, such as an electrical power grid. A system may be configured to provide surplus power to an electrical grid when the system's available power exceeds the demand of a local load, and to source additional power from an electrical grid when the system's available power falls short of the demand of a local load.

FIG. 2B depicts a plot 220 of the energy in kilowatt hours available from the intermediate storage 120 over a 24-hour period. Specifically, the plot 220 depicts kilowatt hours available from the intermediate storage 120 (save for inefficiencies and losses incurred when, for example, converting thermal to electrical energy and when converting energy from DNI to stored heat).

Over a 24-hour period, there is typically, at most times, a mismatch between the power demand and the power supply available from the solar collectors. When the supply derived from the sun via DNI 210 exceeds the demand 205, a portion of the supply derived from the sun is used to meet the demand, and the excess energy is stored in the intermediate storage 120. When the demand 205 exceeds the supply available from DNI 210, the shortfall in demand is met by withdrawing energy from the intermediate storage 120 and adding the withdrawn energy to the energy derived from the sun (if any) in order to produce power to meet the demand. At any instant in time, the demand 205 is met by combining energy derived from the solar radiation incident at the solar collectors 105 (which is plotted at 210) with energy obtained from intermediate storage 120 (which is plotted at 215).

The intermediate storage 120 is typically sized to store sufficient energy to meet the demand for power over a 24-hour period whenever the power demand is in excess of the power that can be derived from solar collectors 105 while the sun is shining. For example, the intermediate storage 120 may be used throughout the night, when the sun is not shining, as depicted by FIGS. 2A and 2C at hours 0000-0500 and 2000 through 2400. The intermediate storage 120 may also be used during the day when the demand 205 exceeds the energy directly available from solar collectors 105 as depicted by plot 210. For example, during the day between 0500 and 2000 excess demand 205 or insufficient generation by solar collectors 105 may cause energy to be drawn from the intermediate storage 120.

Referring again to FIG. 2C, the graph shows the same 24-hour demand line 210 as FIG. 2A. But FIG. 2C also depicts the energy output rate (labeled HP output 225) of the high pressure steam engine 110 and the energy output rate (labeled LP output 230) of the low pressure steam engine 125. Early in the day when the temperature and pressure in the intermediate storage 120 are relatively low, the difference in temperature and pressure between the high pressure steam engine inlet and exhaust is at a maximum. Thus, the power output of the high pressure steam engine 110 may reach a relative maximum, when compared to the later part of the day. As the day progresses and the exhaust from the high pressure steam engine heats the intermediate storage 120, the temperature and pressure differences decrease from the inlet to the exhaust of high pressure steam engine 110. As a result, the available power from the high pressure steam engine 110 decreases. FIG. 2C depicts an initial rise in power from the high pressure engine 110 reaching a maximum between 9 AM and 10 AM and then decreasing.

When the sun is shining, the power output by the low pressure steam engine 125 may be varied to make up the difference between the power from the high pressure steam engine output 225 and the power demand 210. For example, the valve timing of the low pressure steam engine 125 may be varied to adjust the amount of steam entering one or more cylinders during the admission phase. The admission phase may be shortened, so that less steam is admitted into the cylinder. When this is the case, less energy is consumed from the intermediate storage 120 and less power is generated to drive, for example, the electrical generator 130. The admission phase may also be lengthened, so that more steam is admitted into the cylinder, which consumes more energy from the intermediate storage and thus more power is generated by the electrical generator 130. Thus by varying the cutoff of the valve timing, the mass flow rate of the steam from the intermediate storage 120 is controlled, which controls the amount of power generated by the low pressure steam engine 125 and the electrical generator 130.

Referring again to system 100 at FIG. 1, the power to meet the demand 205 is generally the sum of the power produced by the high pressure steam engine 110 and the low pressure steam engine 125. For example, when the sun is shining, water is pumped under pressure to solar collectors 105, which impart heat to the water and generate steam. Next, the steam is provided to an inlet of the high pressure steam engine 110. The high pressure steam engine 110 extracts a portion of the energy from the steam and allows the steam to expand. This expansion provides work by moving one or more pistons of the high pressure steam engine 110. The pistons may move a shaft that drives the electrical generator 115. After expansion, the steam exhaust still contains useful energy (e.g., a temperature of between about 127 and 199 degrees Celsius and a pressure of between about 2.5 and 7.8 bar absolute). The steam exhaust is provided to the intermediate storage device 120. As the steam enters the intermediate storage device 120, most or all of the steam is condensed, thus increasing the temperature and the pressure within the intermediate storage device 120. The condensation of the steam also slightly increases the mass of water in the intermediate storage device 120. In some implementations, the intermediate storage 120 may be heated by other sources of heat including the solar collectors 105, in which case the high pressure steam from the solar collectors may be throttled to enable containment within the intermediate storage 120.

When energy is withdrawn from the intermediate storage device 120, the steam (which is in the space 183 above the water level contained in the intermediate storage device 120) is provided under pressure to a steam inlet of the low pressure steam engine 125. As steam is withdrawn from the intermediate storage device 120, the water at the surface boils (or "flashes") to generate more steam. The low pressure steam engine 125 extracts energy from the steam via an expansion of the steam. This expansion provides work that moves one or more pistons of the low pressure steam engine 125. The pistons may move a shaft that drives the electrical generator 130. The steam exhaust from the low pressure engine 125 then enters the condenser 135, which may be implemented as a sub-atmospheric condenser. The condensed water may be stored in the condenser 135 or the holding tank 140. In any case, the condensed water is recirculated through the system 100 by pumping the water under pressure to the solar collectors 105, at which time the process repeats.

When there is no direct sunlight to provide solar power at the solar collectors 105 (e.g., during the night or when there is cloud cover), substantially all of the output power is typically provided by the low pressure engine 125. The low pressure steam engine 125 meets the variable demand by changing, as noted above, the inlet valve timing (also referred to herein as the "cutoff," "cutoff %" and the "cutoff point"). The variable valve timing enables the low pressure steam engine 125 to meet varying power demands while the inlet steam varies within a range of temperatures and pressures of the steam provided by the intermediate storage 120. The inlet valve timing determines how much steam is allowed to enter into one or more cylinders of the low pressure steam engine 125. The more steam allowed into the cylinder(s) of the low pressure steam engine 125, the greater the average pressure on the piston and thus the greater the power produced. However, this comes at the cost of a greater rate of decrease in the pressure and the temperature of the water in the intermediate storage 120.

Figure 3:
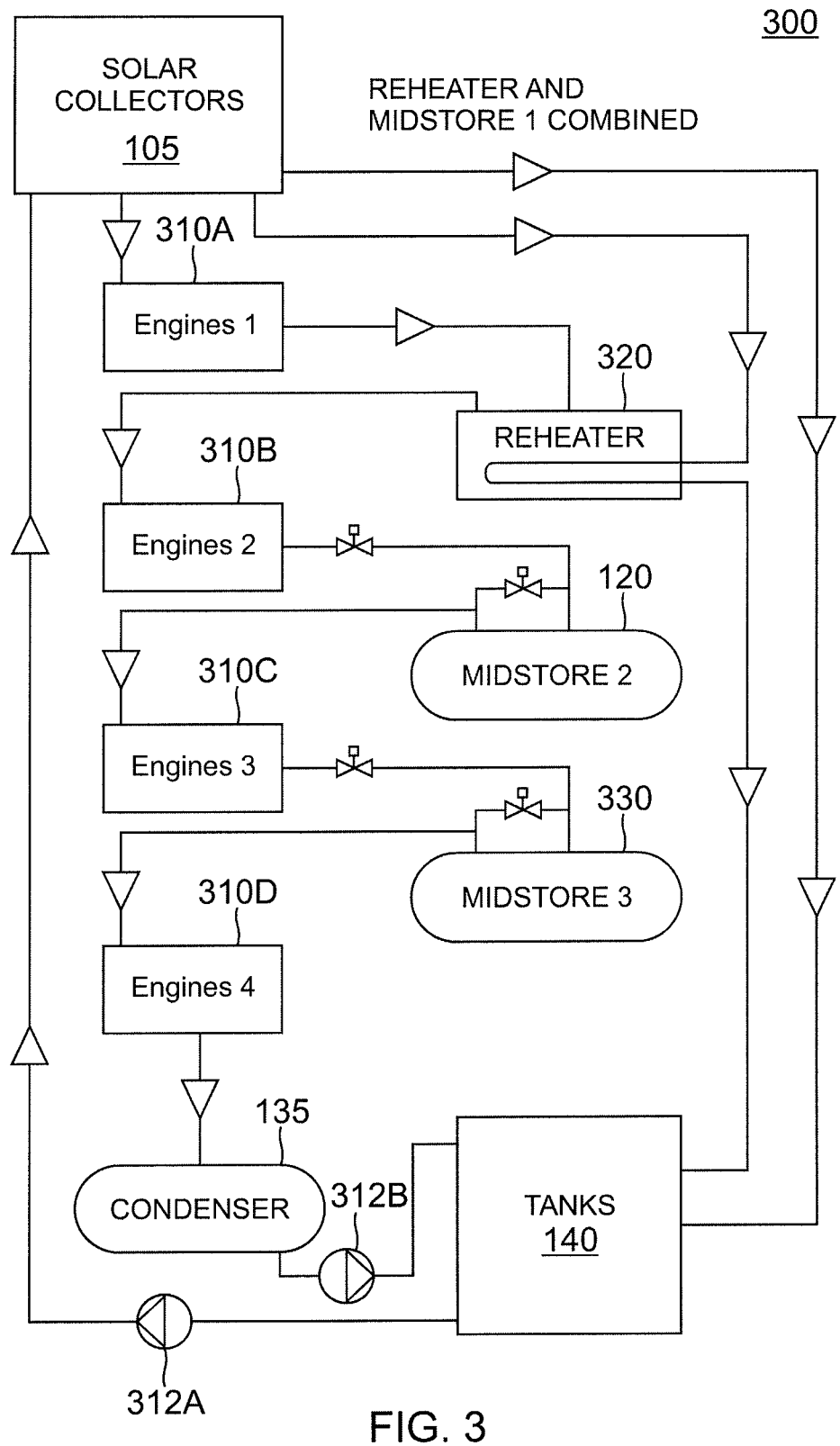
FIGS. 3, 4, 5A, and 5B depict additional examples of systems for producing power using a combination of low and high pressure engines and an intermediate storage.

FIG. 3 depicts a system 300 for generating power, such as electricity, using a combination of low and high pressure engines and intermediate storage. The system 300 is similar to system 100 in many respects. However, the system 300 includes steam engines 310A-D, which may drive one or more electrical generators (not shown) to produce electricity, or may drive a load directly such as machinery. Each of the steam engines 310B may include one or more pistons that ultimately drive one or more shafts to produce output power (e.g., by driving one or more electrical generators).

Each of the steam engines 310A-D may operate at progressively lower pressures and temperatures to provide stages. The term "stage" refers to one cylinder or more than one cylinder having the same or similar inlet pressure and the same or similar exhaust pressure, although the stage may constitute one or more steam engines as well. For example, the steam engine 310A may constitute a stage of one or more cylinders with inlet(s) at the same or similar pressure and temperature (which in this example is a function of the high pressure steam provided by the solar collectors 105). The steam engine 310A may be implemented as a high pressure steam engine. The steam engine 310C may constitute another stage of one or more cylinders with inlet(s) at the same or similar pressure and temperature (which in this case is a function of the steam provided by the intermediate storage 120). This other stage may be implemented as a low pressure steam engine.

The inlet of steam engine 310A may receive steam from a source of thermal energy, such as solar collectors 105. The exhaust of steam engine 310 may enter into a reheater 320. The reheater 320 is used to raise the temperature of the steam to reduce and/or eliminate potentially harmful water droplets generated in the steam as it expands.

The steam engine 310B may receive steam from the reheater 320 and provide exhaust steam to the intermediate storage 120.

The steam engine 310C operates using the steam from the intermediate storage 120. Moreover, the steam exhaust of steam engine 310C is exhausted to an intermediate storage 330.

The steam engine 310D operates using the steam energy from the intermediate storage 330. The steam exhaust of steam engine 310D is output to condenser 135 and tanks 140, which stores the condensed water until the water is pumped back to the solar collectors 105. The pumps 312A-B recirculate water and/or steam in system 300.

Figure 4:
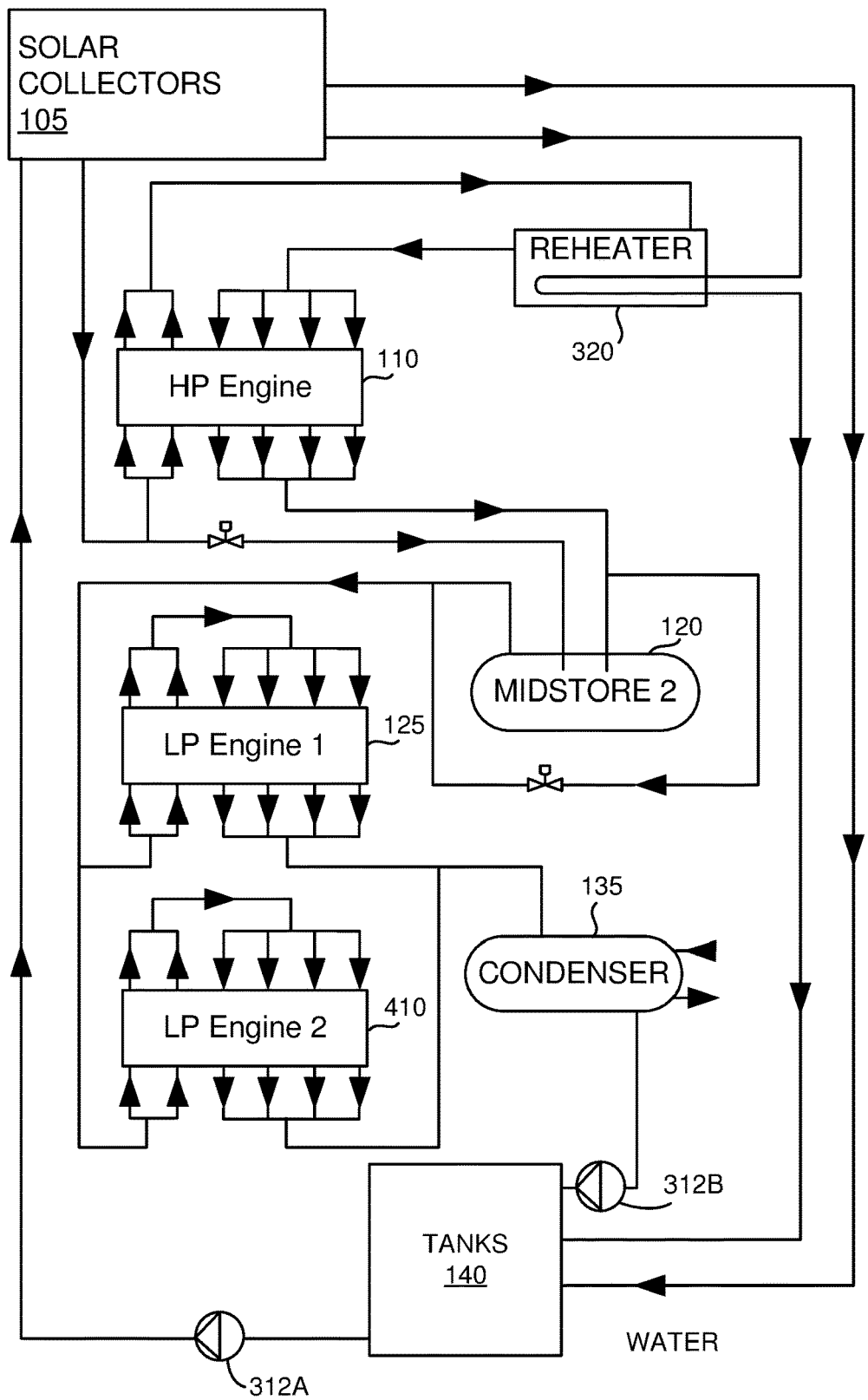

FIG. 4 depicts a system 400 for generating electricity using a combination of low and high pressure engines and intermediate storage. The system 400 is similar to systems 100 and 300 in many respects. However, the system 400 depicts the use of a plurality of low pressure steam engines 125 and 410 and a single high pressure steam engine 110. In some configurations, a plurality of high pressure engines may be used. Moreover, the low pressure steam engines 125 and 410 may be operated singly or in combination using the steam from the intermediate storage 120. For example, when a low output power is desired from the low pressure steam engines 125 and 410, one of the low pressure steam engines may be shut down (or inhibited by other mechanisms). The steam engines 110, 125, and 410 depicted in FIG. 4 are each configured with six cylinders, although other cylinder configurations may be used as well. In some implementations using a six cylinder steam engine configuration, two cylinders may operate with high pressure steam applied directly to those two cylinders. The four remaining cylinders may operate using the steam exhaust from the first two cylinders. As the steam traverses each cylinder (and a corresponding expansion phase in the cylinder), the pressure and the temperature of the steam decreases. In this example, the two higher pressure cylinders comprise one expansion stage and the four lower pressure cylinders comprise another expansion stage. In the implementation of system 400 depicted in FIG. 4, there are four expansion stages.

In some implementations of system 400, the exhaust from the first two cylinders of the high pressure steam engine 110 is coupled to an input of the reheater 320. The reheater 320 heats the exhaust steam to reduce and/or eliminate water droplets generated in the steam as it expands.

Figure 5A:
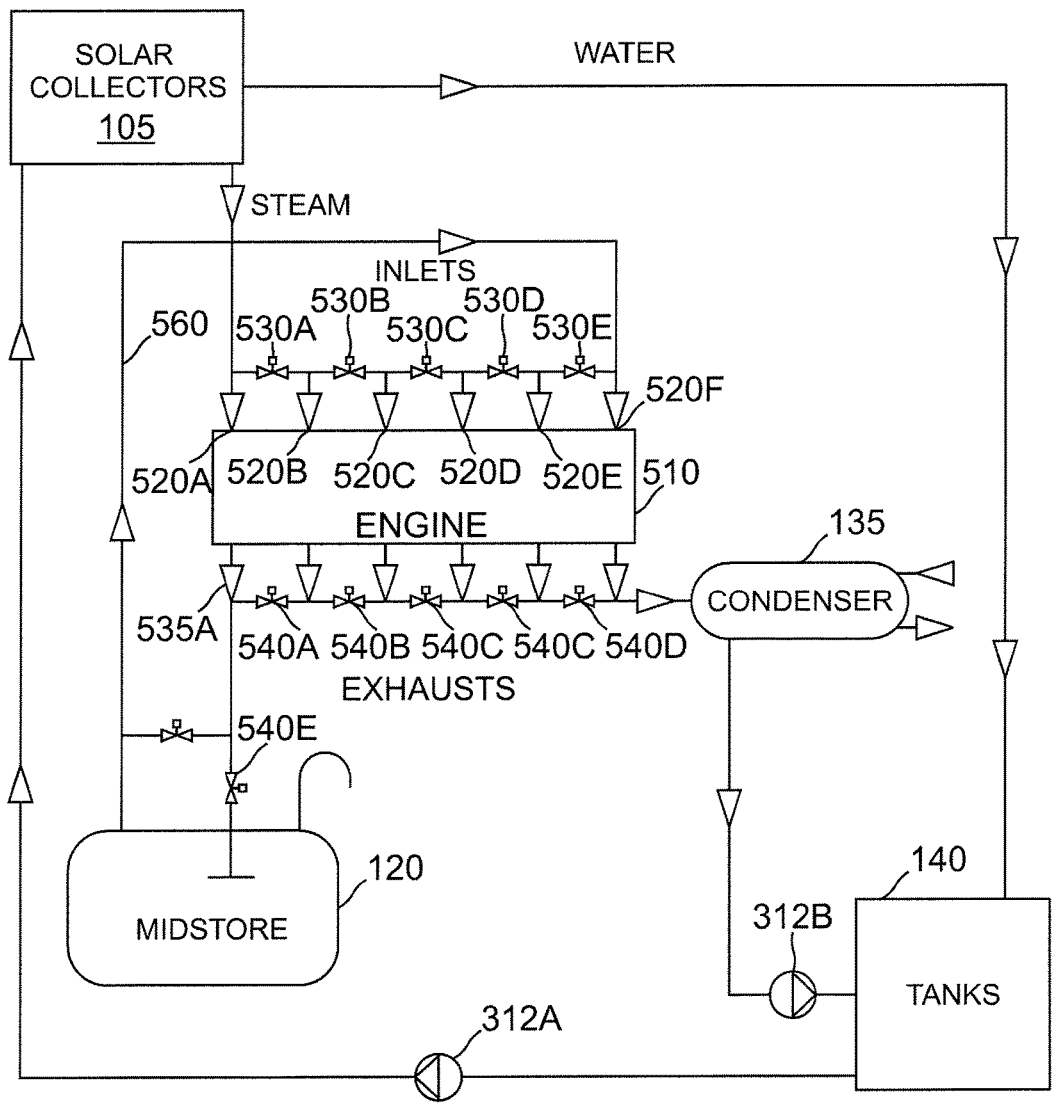

FIG. 5A depicts a system 500 using a combination of low and high pressure steam engines and an intermediate storage. The system 500 is similar to systems 100, 200, 300, and 400 in many respects. However, the system 500 includes only a single steam engine 510 with a plurality of stages (also referred to herein as expansion stages). The steam engine 510 includes a plurality of cylinders corresponding to inlets 520A-F, each cylinder coupled to a corresponding stage having at least one cylinder. The steam input to each of the inlets 520B-F may be selected by control valves, such as control valves 530A-E. By closing a particular one of control valves 530A-E, the source of steam at inlets 520B-F may be selected as a high pressure stage inlet from solar collectors 105, as a low pressure stage inlet from the exhaust of the high pressure stage cylinders, or as a low pressure stage inlet from the intermediate storage 120.

Valves 540A-E may couple the exhaust steam from cylinders selected as high pressure stage cylinders to the inlets of low pressure stage cylinders or to intermediate storage 120. Valves 540A-E may also couple the exhausts from low pressure stage cylinders to condenser 135.

The first stage of the steam engine 510 may operate with a variety of cylinders (e.g., from one to five) operating at the high pressure and the high temperature of the steam supplied by the solar collectors 105. For example, the high pressure and the high temperature steam supplied by the solar collectors 105 enters inlet 520A. After an expansion phase of the cylinder at inlet 520A, steam is output as exhaust at 535A. The steam exhaust at 535A is provided to the intermediate storage 120 for heating and storage. The second stage comprises the remaining cylinders at inlets 520B-F operate from the intermediate storage 120 as a low pressure steam engine via connection 560 and one or more of control valves 530B-E (which control the flow of steam into a corresponding inlet 520B-F).

Although FIG. 5A depicts an engine with a given quantity of stages and intermediate storage, other quantities of stages, cylinders, engines and intermediate storage devices may be used as well.

Figure 5B:
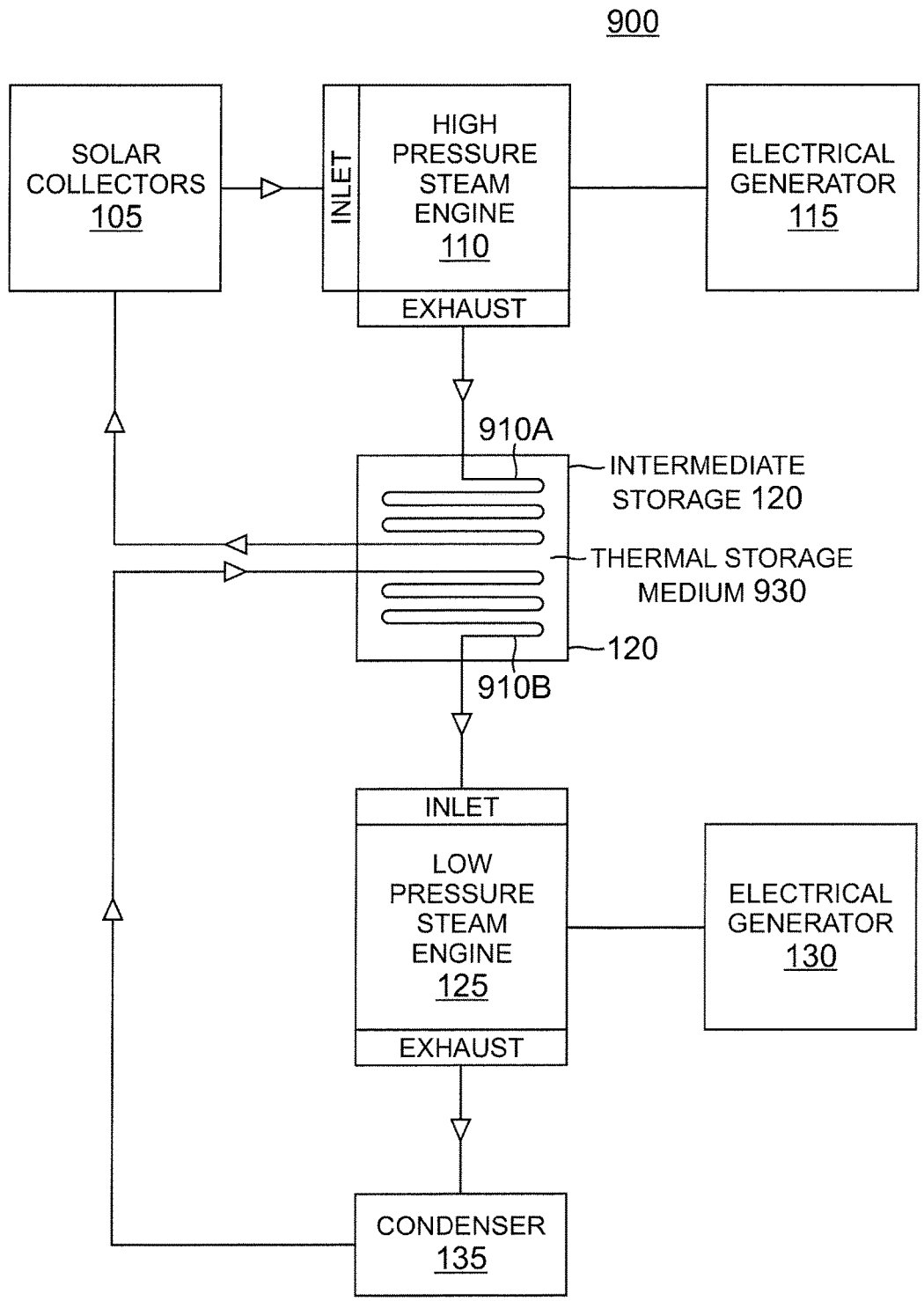

FIG. 5B depicts a block diagram of a system 900 for generating power, such as electricity, using a combination of low and high pressure engines and an intermediate storage. The system 900 includes heat exchangers 910A-B. The steam from the exhaust of high pressure steam engine 110 is provided to the heat exchanger 910A contained within the intermediate storage 120. The heat exchanger 910A heats a thermal medium 930 (e.g., water, oil, sand, and the like). The heated thermal medium 930 provides heat to the heat exchanger 910B, which may include a fluid that changes state to steam. The steam flows to the inlet of the low pressure steam engine 125. The heat exchangers 910A-B at intermediate storage 120 enable the use of a variety of thermal storage mediums including water, sand, concrete, molten salt, a metal, and/or any other material. For example, steam flows from the exhaust of high pressure engine 110 to the heat exchanger 910A. As a consequence, the heat exchanger 910A heats the thermal storage medium 930. The remaining steam of heat exchanger 910A then returns to the solar collectors 105. The other heat exchanger 910B may include water, which transitions to steam when heated by the thermal storage medium 930. The steam flows from the heat exchanger 910B to the inlet of low pressure steam engine 125.

Figure 5C:
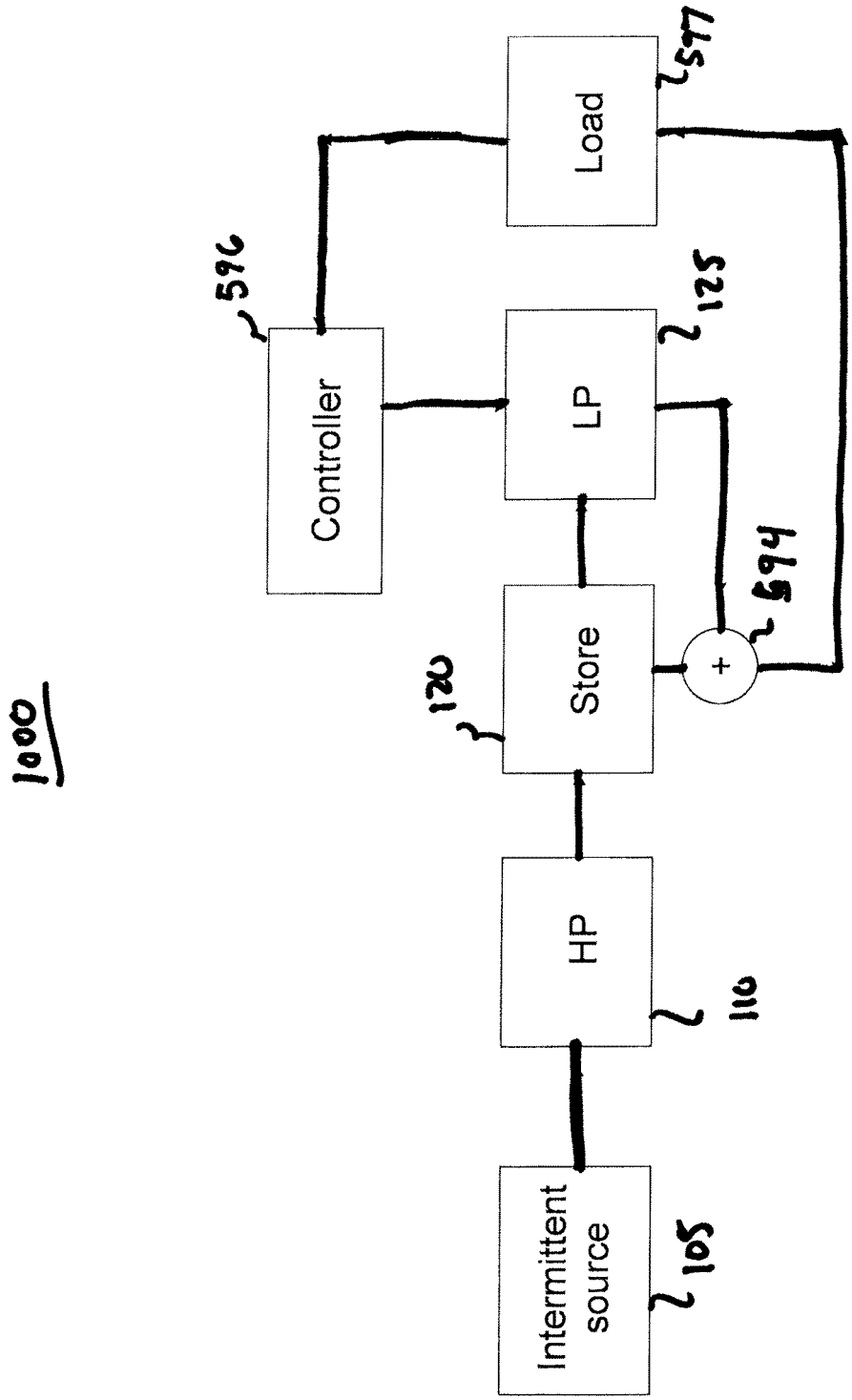
FIG. 5C depicts a controller configured to control one or more steam engines.

FIG. 5C depicts a block diagram of a system 1000 for generating power, such as electricity, using a combination of low and high pressure engines and an intermediate storage. FIG. 5C also depicts a controller 596. The controller 596 matches the output of system 1000 to satisfy a load 597 representing a demand for power at a given instance in time. The controller 597 may operate as a control loop to determine the power required by the load at a given instance, determine the amount of power being generated by the combination of the high pressure steam engine 110 and the low pressure steam engine 125, and then control the low pressure steam engine such that the combined output of the high pressure and low pressure engines satisfies the load at the given instance. Moreover, the controller 596 may control the low pressure steam engine 125 by controlling the mass flow rate at the low pressure steam engine. Specifically, the controller 596 may thus control the low pressure steam engine 125 with regard to the power required to satisfy the load. The controller 596 may also control the high pressure steam engine to maintain a target temperature and a target pressure at the inlet to the high pressure steam engine 110. The controller 596 may thus control the high pressure steam engine 110 to primarily maintain the target temperature and the target pressure at the high pressure, with less regard for the load.

The controller 596 may be implemented in a variety of mechanisms. For example, the controller 596 may include at least one processor and at least one memory, which are configured to control one or more aspects of system 1000.

For example, the controller 596 may receive information from one or more components of system 1000 to control the low and high pressure steam engines as described herein.

In some implementations, the steam engines described herein may be implemented as a unaflow steam engine and/or a universal unaflow steam engine, although other types of reciprocating steam engines may be used as well. A reciprocating steam engine includes at least a cylinder and a piston. The following provides additional description related to some implementations using reciprocating steam engines, such as the unaflow steam engine and/or the universal unaflow steam engine.

Figure 6:
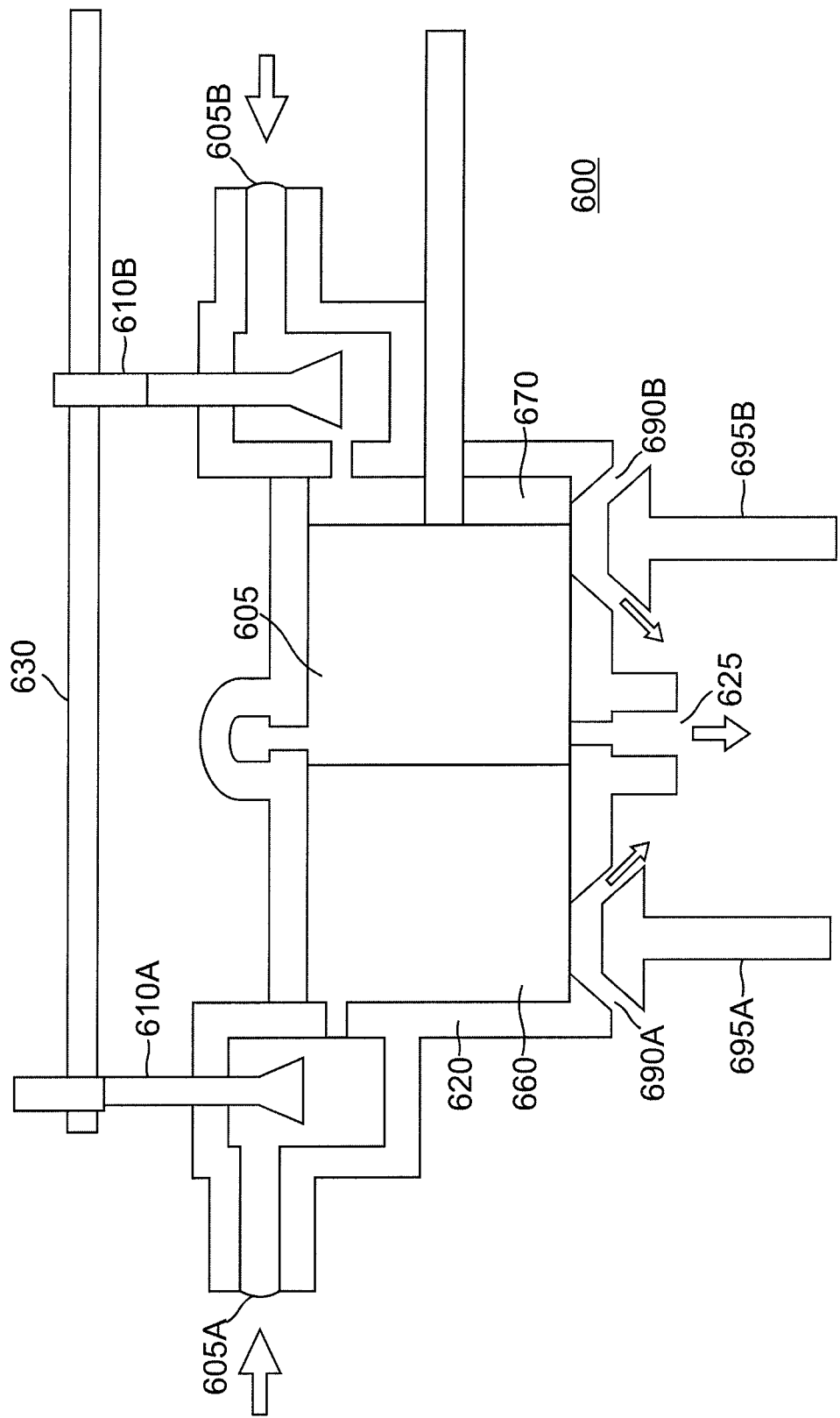
FIG. 6 depicts an example of a steam engine.

FIG. 6 depicts an example of a unaflow steam engine 600. The unaflow steam engine includes inlets 605A-B through which steam flows (e.g., from solar collectors 105) under the control of valves 610A-B (which may be implemented in various ways such as poppet valves, single beat poppet valves, double beat poppet valves, or piston valves). The steam is expelled during an exhaust phase through a port 625 and auxiliary exhaust ports 690A-B. When the valve 610B is open, steam is admitted into the upper cavity 670 of the cylinder, and then the valve 610B closes such that the steam expands and pushes the piston 605 down. When the piston uncovers the exhaust port 625, the steam is expelled as exhaust steam.

At about the same time that the piston uncovers exhaust port 625, the auxiliary exhaust valve 695B is opened, such that when the piston travels upward, steam continues to be expelled as exhaust steam through the auxiliary exhaust port 690B. About when the piston covers the auxiliary exhaust port 690B, the auxiliary exhaust valve 695B closes so that steam is not expelled through the auxiliary exhaust port 690B on the downward power stroke of the piston 605. The piston may be double acting, so that when the piston is approximately at the lower end of its travel, the inlet valve 610A opens to admit steam into the lower cavity 660 of the cylinder. Next, the valve 610A closes such that the steam expands and pushes the piston 605. When the piston uncovers the exhaust port 625, the steam is expelled as exhaust steam.

At about the same time that the piston uncovers the exhaust port 625, the auxiliary exhaust valve 695A is opened and steam continues to be expelled as exhaust steam through the auxiliary exhaust port 690A. About when the piston covers the auxiliary exhaust port 690A, the auxiliary exhaust valve 695A closes so that steam is not expelled through the auxiliary exhaust port 690A on the upward power stroke of the piston 605. For power strokes, the inlet valves 610B and 610A respectively remain open for a portion of the power stroke, then close to allow the steam to expand. The mass of steam admitted to the cylinder is variable, and is controlled by varying the timing of the closure of valves 610A-B. The timing of the closure of the valves is referred to as cutoff.

When the piston 605 opens the port 625 and the auxiliary exhaust valves 690A-B open, the steam in 660 or 670 is expelled through the port 625 and/or the auxiliary exhaust ports 690A-B. This expansion of the steam between when inlet valves 610A-B are closed and when the exhaust ports 625 and 690A-B are opened results in steam that is at a lower temperature and lower pressure, when compared to the steam provided to the inlets 605A-B.

FIGS. 7A-E depict indicator diagrams for a steam engine. The indicator diagrams plot cylinder pressure versus the position of the piston in the cylinder. The zero position of the piston is where the cylinder volume is the clearance volume (e.g., when the piston is near the head) and the 0.2 meter position indicates the piston moving 0.2 meters from the head (e.g., 0.2 meters represents piston 605 moving 0.2 meters down from the top of its stroke at FIG. 6). Each of the areas 705A-E is directly proportional to the energy transferred from the steam (which is admitted into the cylinder) to the piston. Only the downward (e.g., to the right at FIG. 6) power stroke and upward (e.g., to the left at FIG. 6) exhaust stroke are described below, although the upward power stroke and down exhaust stroke may be represented with indicator diagrams.

A constant high pressure is depicted at 710A. This constant high pressure continues while the inlet valve 610A is open and the piston 605 moves away from the cylinder head. As the piston 605 moves, incoming steam keeps the steam pressure constant until the inlet valve 610A begins to close. The transition from a fully open inlet valve 610A to a closed inlet valve is depicted at 712A. When the inlet valve 610A is closed, the steam pressure in the cylinder falls. When the piston 605 uncovers the unaflow exhaust port 625 and/or the auxiliary exhaust valve 690B, the steam exhausts and the pressure falls to a value substantially equal to the pressure at the exhaust. The rate of pressure drop depends on how much the port 625 and/or the auxiliary exhaust valve 690B are opened. The rate of pressure drop also depends on the remaining pressure difference between the cylinder 620 and the exhaust.

The auxiliary exhaust valve 690B opens before the unaflow exhaust port 625 is closed by the return of the piston 605. As the piston moves back toward the cylinder head, steam exhausts at a pressure very close to the exhaust duct pressure. As the piston is covering the auxiliary exhaust port 690B, the cylinder pressure rises. When the auxiliary exhaust port 690B is fully covered by the piston, the pressure in the cylinder rises rapidly as the piston compresses the remaining steam in the cylinder until the piston reaches a point proximate to the cylinder head, as shown by 706A-E.

Figure 7A:
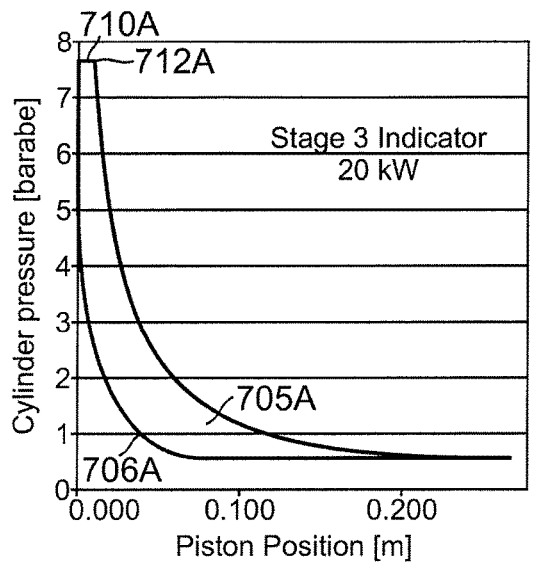
FIGS. 7A-E depict indicator diagrams.
Figure 7B:
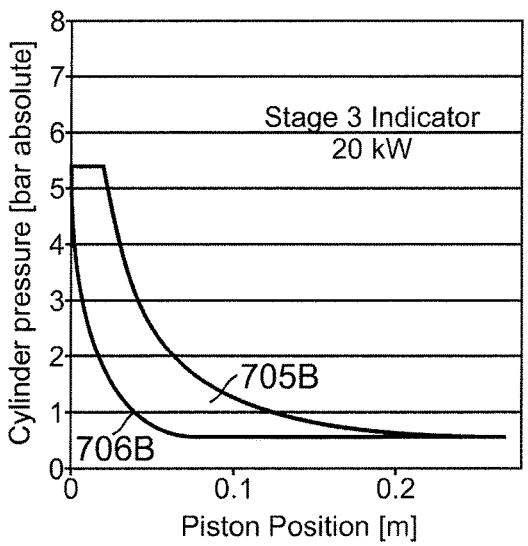
Figure 7C:
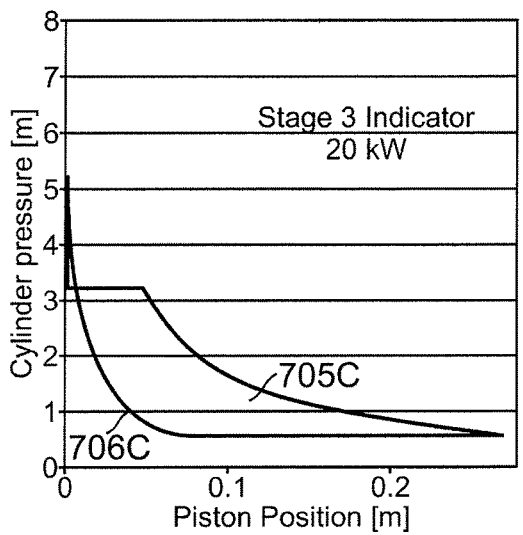
Figure 7D:
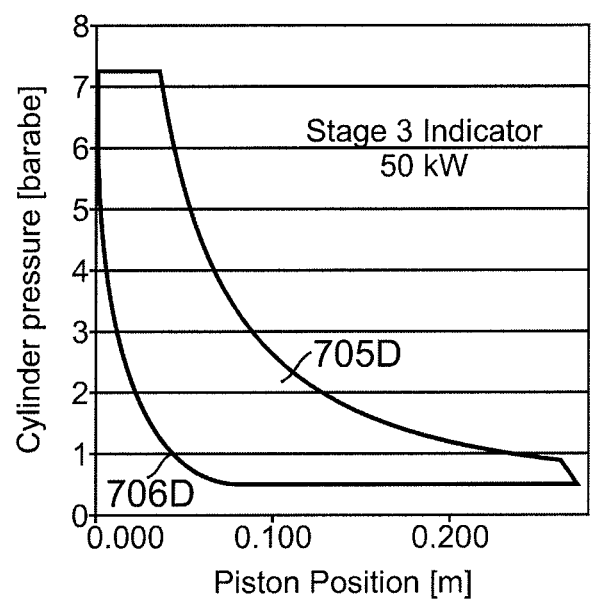
Figure 7E:
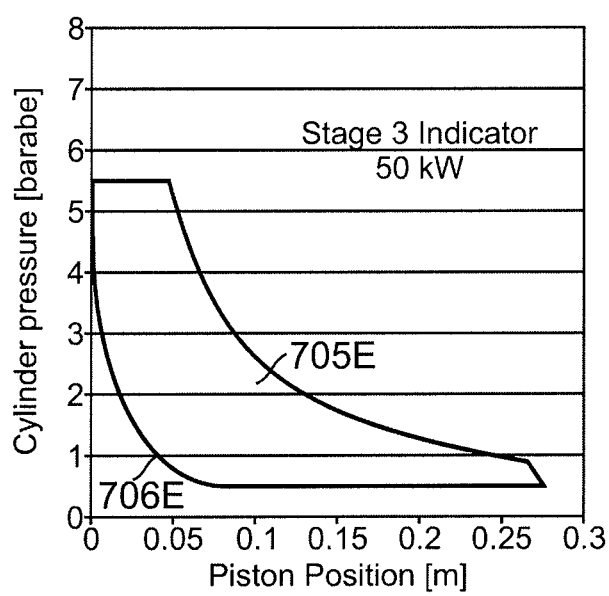

The indicator diagrams at FIG. 7A-E provide information which may be used to determine when to close the inlet valves of the steam engine 600 to provide a relatively constant power output over a wide variation in supply pressure (e.g., from the intermediate storage 120). In the indicator diagrams 7A-C, the steam is fully expanded, so most of the energy available in the steam has been extracted. When steam is fully expanded, essentially all of the energy that can be extracted from the steam has been extracted. If the expansion is incomplete, less power is extracted from the steam. FIGS. 7D-E depict incomplete expansion. FIGS. 7D-E also depict how dramatically the increase of cutoff can increase engine stage output for high and medium pressures. The variation is even greater when one, two, or more engines are used.

The indicator diagrams may also be used to determine the expected power output from the high pressure engine as the inlet valve timing is varied. Moreover, the indicator diagrams may be used to determine a mass flow rate of the steam flowing into the high pressure engine in order to maintain the inlet pressure and the inlet temperature within a desired operating range regardless of the rate of heat collected by the solar collectors 105.

Figure 8:
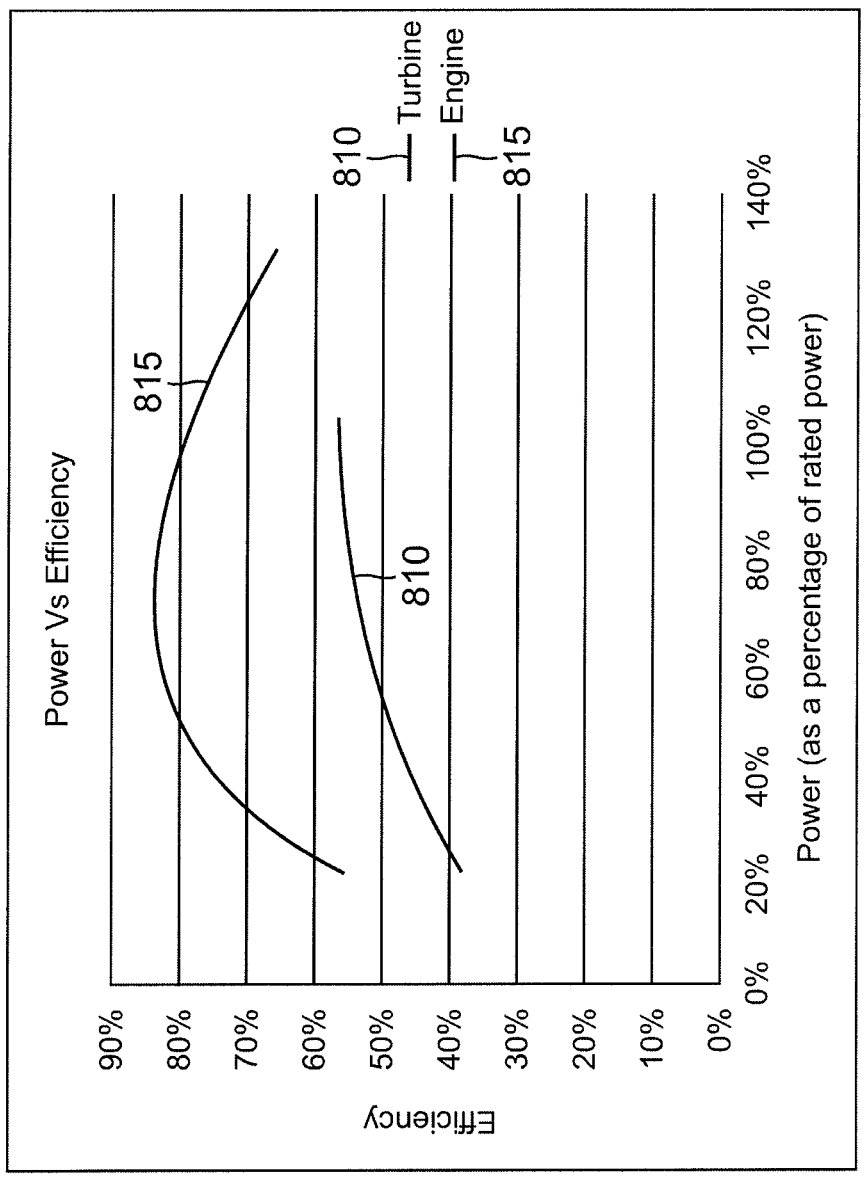
FIG. 8 depicts a comparison of a steam turbine engine and a reciprocating steam engine, such as a unaflow steam engine.

FIG. 8 depicts a comparison of power versus isentropic efficiency for the reciprocating steam engine described herein (plotted at 815) and a steam turbine (plotted at 810). Although both 810 and 815 can be run as low as 20% of rated power, the isentropic efficiency of the steam turbine at 20% is merely 38%, while the reciprocating steam engine has an isentropic efficiency of 55%. The steam turbine engine has an isentropic efficiency that steadily increases as the power output is ramped up to a maximum isentropic efficiency of 57% at 100% power. The reciprocating steam engine has an isentropic efficiency that peaks at just under 84% at 70% of rated power but maintains above 80% isentropic efficiency from 45% to 95% rated power. Moreover, isentropic efficiency for the reciprocating steam engine 815 is above 70% for rated power from 35% to 120%.

Although a variety of steam engines may be used, it is the ability of the reciprocating steam engine to control the mass flow rate of the steam input, and thus control the power output and/or the upstream pressure (which is typically under widely varying inlet and exhaust temperatures and pressures) that enables the combination of steam engines and intermediate storage to be operative to provide power that can be varied to match a varying power demand 24-hours per day despite the circumstance where the rate of energy provided by a heat energy source rarely matches the rate of demand.

FIGS. 1-8 are merely examples as other configurations and elements may be included therein. For example, although FIG. 1 depicts that the solar collectors 105 is coupled to the inlet of the high pressure steam engine 110, other devices, such as a heat exchanger and the like, may be present in that path as well.

The foregoing description is intended to illustrate but not to limit the scope of the invention, which is defined by the scope of the appended claims. Other embodiments are within the scope of the following claims.

What is claimed:

1. An energy storage and delivery system comprising:
first and second reciprocating steam engines arranged to use steam as a working fluid; and
an intermediate storage including a pressure vessel arranged to hold a mass of the working fluid, the intermediate storage being arranged to receive, condense and store at least some of the steam expelled from the first reciprocating steam engine as part of the mass of working fluid and to serve as a source of flash steam for the second reciprocating steam engine whereby the same working fluid passes through the first and second reciprocating steam engines; and
wherein a first exhaust of the first reciprocating steam engine is plumbed to (a) the intermediate storage such that steam from the first exhaust is injected into liquid water that is part of the mass of working fluid contained by the intermediate storage, whereby the steam from the first exhaust imparts thermal energy to the mass of working fluid as the steam condenses into the water, and (b) to the second reciprocating steam engine to thereby bypass the intermediate storage; and
wherein the second reciprocating steam engine is configured to be selectably driven by steam from at least one of the intermediate storage and the first exhaust from the first reciprocating steam engine, whereby, at times, the second reciprocating steam engine is driven by steam received from the first exhaust thereby bypassing the intermediate storage and at other times is driven by steam received from the intermediate storage.

2. An energy storage and delivery system as recited in claim 1, wherein the source of thermal energy generates the steam, and wherein the source of thermal energy comprises at least one of a solar collector and a heat exchanger.

3. An energy storage and delivery system as recited in claim 1, wherein the intermediate storage is additionally coupled to the source of thermal energy through a path that does not include the first reciprocating steam engine to facilitate heating the mass of working fluid stored within the pressure vessel.

4. An energy storage and delivery system as recited in claim 1, configured such that when steam is released from the intermediate storage device, water that is part of the mass of working fluid in the intermediate storage device boils to generate more steam.

5. An energy storage and delivery system as recited in claim 1 further comprising: at least one memory; and at least one processor, wherein the at least one memory and the at least one processor are configured to provide operations comprising:
determining a first amount of power to satisfy a load;
determining a second amount of power being generated by the first reciprocating steam engine; and
controlling the second reciprocating steam engine such that the combined output of the first and second reciprocating steam engines combine to deliver the first amount of power.

6. An energy storage and delivery system as recited in claim 1 wherein the intermediate storage is a pressure vessel, wherein the pressure vessel is arranged to hold water and saturated steam.

7. A method of operating an energy storage system that includes first and second reciprocating steam engines and a pressure vessel that serves as an intermediate store that stores a mass of working fluid that includes steam and liquid water, the method comprising:
driving the first reciprocating steam engine using steam received from a first steam source, the first reciprocating steam engine having a first inlet and a first exhaust and being configured to receive and exhaust the steam received from the first steam source;
injecting at least some of the steam exhausted from the first reciprocating steam engine into the liquid water stored in the pressure vessel, wherein at least some of the steam injected into the liquid water condenses into the mass of working fluid to thereby impart thermal energy into the mass of working fluid as the injected steam condenses into the liquid water; and
driving the second reciprocating steam engine using steam released from the pressure vessel, wherein releasing steam from the pressure vessel causes some of the liquid water stored in the pressure vessel to flash into steam suitable for use in driving the second reciprocating steam engine; and
wherein at first selected times, the first reciprocating steam engine is driven while the second reciprocating steam engine is not operated, and at second selected times, the second reciprocating steam engine is driven while the first reciprocating steam engine is not operated.

8. A method as recited in claim 7 wherein at least one of a valve timing, a rotation per minute, a quantity of cylinders, and a quantity of engines of the first reciprocating steam engine is varied, the variation maintaining, at the first inlet, a target temperature and a target pressure in the received steam.

9. A method as recited in claim 7, wherein at least one of a valve timing, a rotation per minute, a quantity of cylinders, and a quantity of engines of the first reciprocating steam engine is varied to control, at the first inlet, a mass flow rate of the steam received from the source of thermal energy.

10. A method as recited in claim 7, wherein a first mass flow rate is controlled at the first inlet of the first reciprocating steam engine, and wherein the first mass flow rate is controlled to maintain the inlet steam within at least one of a first range of temperatures and a second range of pressures.

11. A method as recited in claim 7, wherein a second mass flow rate of the second reciprocating steam engine is controlled based on at least one of a temperature of the intermediate storage and a pressure of the intermediate storage and based on a desired power output from the second reciprocating steam engine.

12. A method as recited in claim 7 further comprising controlling the second reciprocating steam engine with regard to a first amount of power required to satisfy a load.

13. A method as recited in claim 7 further comprising heating the intermediate storage using a second source of energy other than the source of thermal energy.

14. A method as recited in claim 7 wherein the first and second reciprocating steam engines are configured to produce power and the power produced is a combination of at least one of the first reciprocating steam engine and the second reciprocating steam engine, wherein the power produced satisfies a demand, and wherein the rate of energy provided by the source of thermal energy used to produce power is not matched to the demand.

15. A method of operating an energy storage system that includes first and second reciprocating steam engines and a pressure vessel that serves as an intermediate store that stores a mass of working fluid that includes steam and liquid water, the method comprising:

driving the first reciprocating steam engine using steam received from a first steam source, the first reciprocating steam engine having a first inlet and a first exhaust and being configured to receive and exhaust the steam received from the first steam source;

injecting at least some of the steam exhausted from the first reciprocating steam engine into the liquid water stored in the pressure vessel, wherein at least some of the steam injected into the liquid water condenses into the mass of working fluid to thereby impart thermal energy into the mass of working fluid as the injected steam condenses into the liquid water;

sometimes driving the second reciprocating steam engine using steam released from the pressure vessel, wherein releasing steam from the pressure vessel causes some of the liquid water stored in the pressure vessel to flash into steam suitable for use in driving the second reciprocating steam engine; and sometimes driving the second reciprocating steam engine using steam received from the first exhaust thereby bypassing the intermediate store.

16. A method as recited in claim 7 wherein at third selected times, the first and second reciprocating steam engines are driven concurrently.

* * * * *